United States Patent

[11] 3,582,942

| [72] | Inventors | William L. Carter, Jr.<br>Pittsburgh;<br>Raymond G. Stein, Jr., Allison Park;<br>Donald R. Little, Greenburg, all of, Pa. |
|---|---|---|
| [21] | Appl. No. | 771,030 |
| [22] | Filed | Oct. 28, 1968 |
| [45] | Patented | June 1, 1971 |
| [73] | Assignee | Westinghouse Air Brake Company<br>Swissvale, Pa. |

[54] DIGITAL-TO-ANALOG CONVERSION CIRCUIT
11 Claims, 3 Drawing Figs.

[52] U.S. Cl. .................................................. 340/347AD,
                                                        324/111
[51] Int. Cl. .................................................. H03k 13/20
[50] Field of Search .................................................. 328/140;
        340/173.2, 347; 320/1 X; 235/150, 51; 324/111

[56] References Cited
UNITED STATES PATENTS

| 2,915,632 | 12/1959 | Moore | 320/1X |
| 2,957,136 | 10/1960 | Franz | 320/1X |
| 3,040,983 | 6/1962 | Bigelow | 235/150.51X |
| 3,100,269 | 8/1963 | Barry | 320/1X |
| 3,439,272 | 4/1969 | Bailey et al. | 324/99X |
| 3,484,681 | 12/1969 | Grady, Jr. et al. | 324/111X |

Primary Examiner—Daryl W. Cook
Assistant Examiner—Gary R. Edwards
Attorneys—W. L. Stout and H. A. Williamson ABSTRACT: This invention relates to a digital-to-analog conversion circuit to operate from an initial reference point over a given range to a final reference point. The circuit includes an energy storage device, a charging circuit, and a discharging circuit. The charging circuit is electrically coupled to the energy storage device for initially controlling the amount of energy stored therein. The discharging circuit has a digital pulse input which has pulse rates within a given frequency range. The discharging circuit is electrically coupled to the energy storage device to incrementally reduce the amount of energy stored in the energy storage device. This is done as a function of both the digital pulse rate and a preselected incremental energy reduction rate. The energy storage device has an output taken across the energy storage device and this output has an analog value which is proportional to the difference between the above-noted final reference point and an intermediate point of the aforementioned given range.

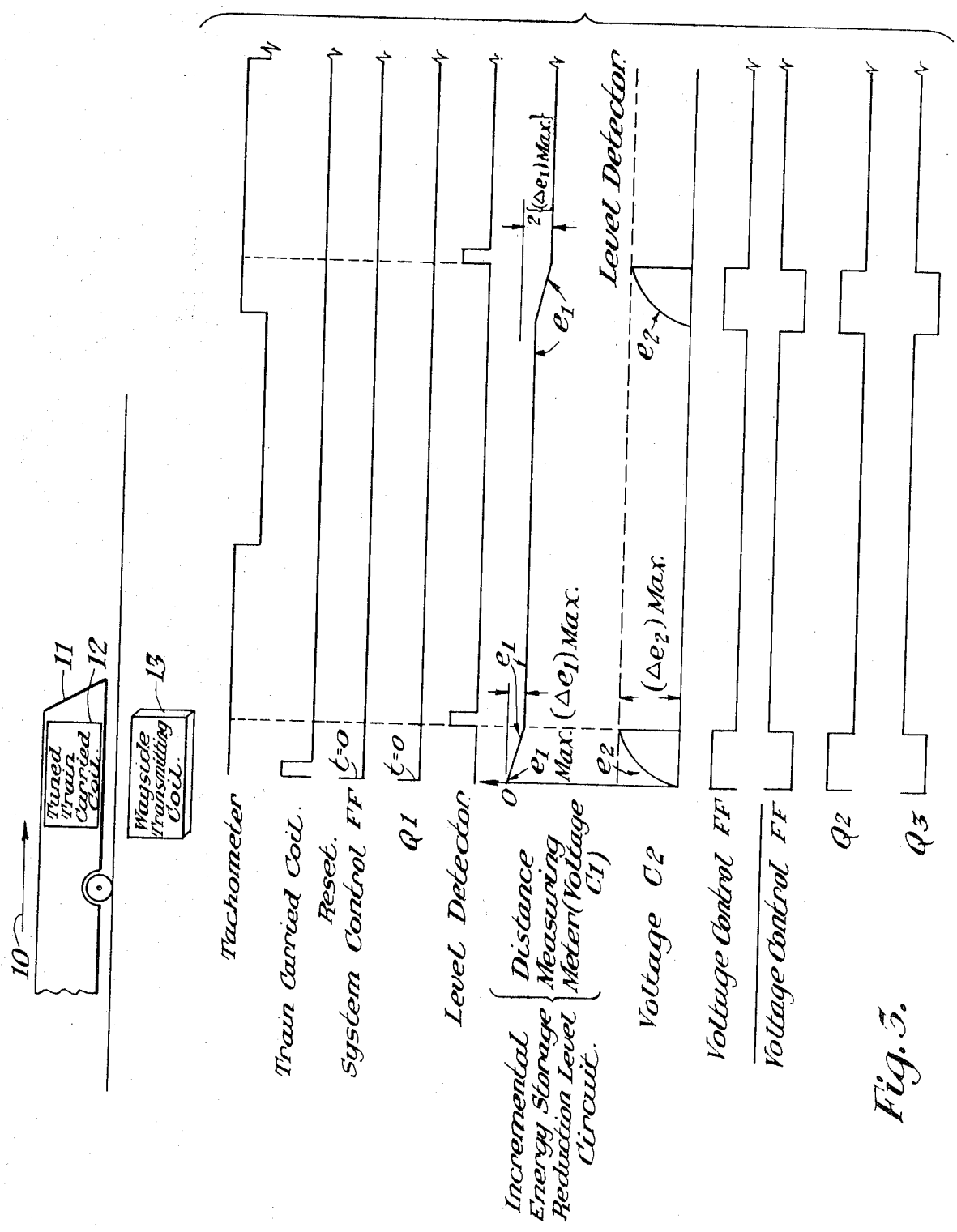

DIGITAL-TO-ANALOG CONVERSION CIRCUIT

This invention relates to a digital-to-analog conversion circuit.

More specifically, this invention relates to a digital-to-analog conversion circuit to operate from an initial reference point over a given range to a final reference point. The digital-to-analog conversion circuit includes an energy storage circuit, a charging circuit, a digital pulse generating source, an incremental energy storage reduction circuit, an incremental energy storage reduction level limiting circuit, and an energy transversion control circuit.

The above-noted charging circuit is electrically coupled to the energy storage circuit for effectively initially controlling the amount of energy stored in the energy storage circuit. The incremental energy storage reduction circuit is electrically coupled to the incremental energy storage level limiting circuit and the energy transversion control circuit is electrically controllingly coupled to the energy storage circuit and to the incremental energy storage reduction circuit. The energy transversion control circuit is also electrically coupled to the digital pulse generator source, which digital pulse source produces pulses at rates within a given input range, to associatively control the energy transversion control circuit. The incremental energy storage level limiting circuit is electrically associatively controllingly coupled to the energy transversion control circuit to thereby provide in combination with the digital pulse generator source a commutating action between the energy storage circuit and the incremental energy storage reduction circuit. Accordingly, the stored energy in the energy storage circuit is incrementally reduced at a rate proportional to the digital pulse rate of the digital pulse generating source. The energy storage circuit has an output taken across the energy storage circuit and this output has an analog value which is proportional to the difference between the final reference point and an intermediate point of the given range.

In railroad vehicle distance measuring applications the need for efficient digital input to analog output conversion arises so that accuracy may be maintained while costs, mechanical and electrical layout, and circuit surveillance may be kept at a minimum. In the case of prior art distance measuring circuits which require digital-to-analog conversion, there is a lack of inherent circuit capacity for providing reliable output indications without the use of multiple stage counters or decoders which perform no other function in such circuits but to count or decode. Such circuits may include flip-flop banking arrangements or relay trees or brush wheel contactors, etc., all of which are mechanically cumbersome and electrically complex. It is, therefore, desirable to provide a digital-to-analog conversion circuit which is relatively compact and sophisticated electronically. The digital-to-analog conversion circuit to be described hereinafter avoids the aforementioned undesirable characteristics, while encompassing the above-noted preferred characteristics.

It is, therefore, an object of this invention to provide an improved digital-to-analog conversion circuit for converting digital input data to analog output data.

Another object of this invention is to provide a new and improved digital-to-analog conversion circuit which may be employed in railroad applications as a distance measuring circuit.

A further object of this invention is to provide a novel digital-to-analog conversion circuit which is simple in mechanical layout, electrically sophisticated, as well as structurally economical.

Yet another object of this invention is to provide an improved digital-to-analog conversion circuit which may be completely electronic in nature.

Still another object of this invention is to provide a novel digital-to-analog conversion circuit which will provide an accurate analog output indication in conjunction with a digital input by the employment of an energy storage circuit, a charging circuit which is electrically coupled to and initially charges the energy storage circuit, and a discharging circuit which has a digital pulse input and is electrically coupled to the energy storage circuit and which incrementally reduces the amount of energy stored in the energy storage circuit so that an output taken from the energy storage circuit will have an analog value.

In the attainment of the foregoing objects a distance measuring circuit with inherent digital-to-analog conversion ability has been invented for measuring vehicle distance from a given point. The distance measuring circuit includes an energy storage capacitor, a charging circuit, a digital pulse generating source, an incremental energy storage reduction capacitor, a level detector, and first and second switches.

The charging circuit is electrically coupled to the energy storage capacitor for effectively initially controlling the amount of energy stored in the energy storage capacitor. The first and second switches are electrically coupled to and controlled in part by the digital pulse generating source which produces pulses at rates proportional to vehicle speed. The first switch is electrically coupled between the energy storage capacitor and the incremental energy storage reduction capacitor. The first switch has a switching rate which is controlled by the digital pulse source and the level detector. The second switch is electrically coupled in a parallel relationship with the incremental energy storage reduction capacitor and the level detector. The switching rate of the second switch is also controlled in part by the digital pulse generating source and in part by the level detector. A commutating action is thereby produced between the first and second switches and the energy stored in the energy storage capacitor is incrementally reduced as a function of both the digital pulse rate and a preselected incremental energy value that has been allowed to be placed in the incremental energy storage reduction capacitor by the level detector. The energy storage capacitor has an output which is taken across the energy storage capacitor and has an analog value proportional to distance from any given point in time.

Other objects and advantages of the present invention will become apparent from the ensuing description of illustrative embodiments thereof, in the course of which reference is had to the accompanying drawings in which.

Figure 1:
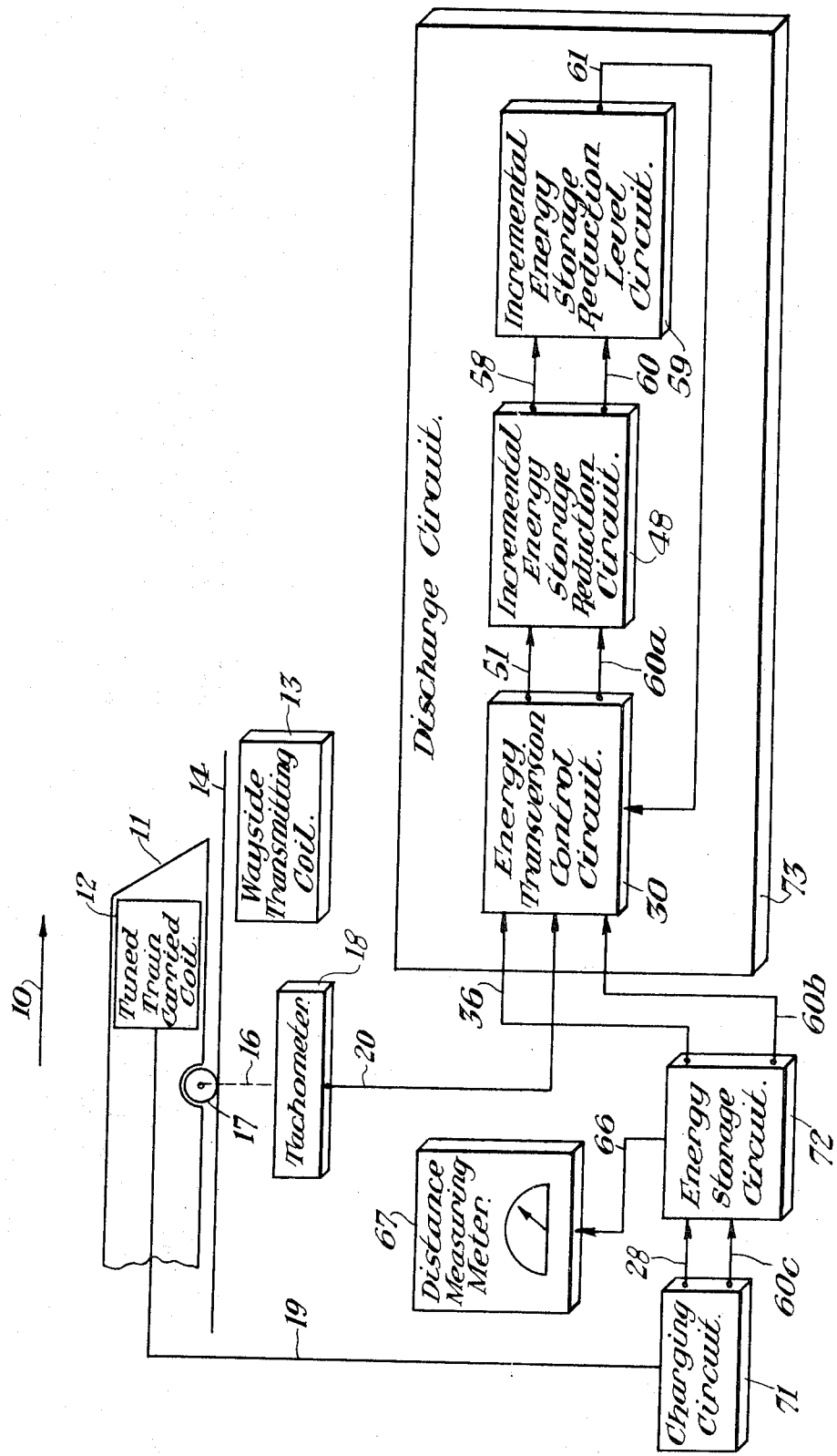
FIG. 1 illustrates in block diagram form the digital-to-analog conversion circuit embodying the present invention.

FIG. 3 sets forth a diagram illustrating the sequential gating of the various pertinent components of the digital-to-analog conversion circuit in FIG. 1.

A description of the above embodiments will follow and then the novel features of the invention will appear in the appended claims.

SYSTEM DESCRIPTION

Reference is now made to the drawings and particularly to FIG. 1 which illustrates in block diagram form the unique digital-to-analog conversion circuit embodying the present invention. As shown a train 11 carrying a conventional tuned receiving coil 12 is traveling along the tracks 14 in a direction indicated by the direction arrow 10. It should be understood that all of the block diagram components shown in FIG. 1 with the exception of wayside coil 13 are train carried and these components have been set out in the manner depicted for purposes of clarity.

The train 11 has a mechanical coupling 16, shown in broken line, between a wheel 17 and a tachometer 18. As the train moves along the track 14 the tachometer 18 is driven through mechanical coupling 16 at a rate proportional to vehicle speed. The tachometer 18 is of the type that will produce a pulsed output and this pulsed output, which may be termed a digital pulse source, will appear on lead 20 from the tachometer 18. The tachometer 18 may be of the type shown and described in the copending application for Letters Pat. of the U.S., Ser. No. 724,041, filed Apr. 25, 1968, by Reed H. Grundy, for Pulse Generator, which application is assigned to the same assignee as this application. In the alternative the tachometer 18 may be any conventional device and/or circuitry which produces pulse outputs at rates proportional to vehicle axle rotation. A typical pulse output of tachometer 18 present on lead 20 is depicted in FIG. 3 and is designated by the heading "Tachometer." The cooperative function of this pulse output with the other components of the system will be more fully explained hereinafter.

There is positioned along the wayside a transmitting coil 13. The transmitting coil 13 in this particular embodiment is positioned at some point along the tracks 14 before an upcoming station, not shown. The presence of wayside transmitting coil 13 is to define some initial reference point from which the system is to commence its operation. The wayside transmitting coil 13 can operate at a frequency equal to that at which the receiving coil 12 is tuned. It is to be understood that the practice of the invention to be described does not require any specific mechanism to initiate operation as long as there is provided apparatus which produces a pulse output indicative of the fact that the system is to commence operation. The train-carried coil 12 is electrically coupled to a charging circuit 71 by lead 19. As will become evident hereinafter the charging circuit is operative to initially provide energy to be stored in the energy storage circuit 72, which energy storage circuit 72 is electrically coupled to the charging circuit 71 by lead 28 and lead 60c. The charging operation will be explained more fully hereinafter. When the train-carried coil 12 passes the wayside transmitting coil 13, a sharp narrow pulse is produced on output lead 19 of the train-carried coil 12. The pulse is depicted in FIG. 3 adjacent the heading "Train Carried Coil." This sharp narrow pulse is delivered to the charging circuit 71 via the lead 19 to thereby interrupt the charging operation and allow the energy storage circuit 72 to enter into a discharge mode of operation by the discharge of a portion of its stored energy into the discharging circuit 73 in a manner to be described hereinafter. The amount of energy discharged and the rate of discharge are controlled by energy transversion control circuit 30, which is electrically coupled to the energy storage circuit 72 by leads 36 and 60b. The discharge circuit 73 has three main components, one of which is the energy transversion control circuit 30 just noted. The second component is an incremental energy storage reduction circuit 48 electrically coupled to the energy transversion control circuit 30, and to a third component termed an incremental energy storage reduction level circuit 59, respectively, by leads 51, 60a and 58, 60, 61.

The energy transversion control circuit 30 is mutually controlled by the digital pulse output from the tachometer 18 over lead 20 as well as an output from the incremental energy storage reduction level circuit 59 over lead 61. The output from the tachometer 18 establishes the rate at which specific incremental values of energy are removed from the energy storage circuit 72, while the energy storage reduction circuit 48 and the incremental energy storage reduction circuit 59 combine to establish the means of incrementally reducing stored energy and the energy level change for each increment. The energy in the energy storage circuit 72 is measured by a voltage level or distance measuring meter 67 which provides an analog output and is electrically connected to the energy storage circuit 72 by lead 66.

It is therefore seen that the digital pulse input to the energy transversion control circuit from the tachometer 18 will be reflected in an analog output at distance measuring meter 67.

SYSTEM OPERATION

Figure 2:
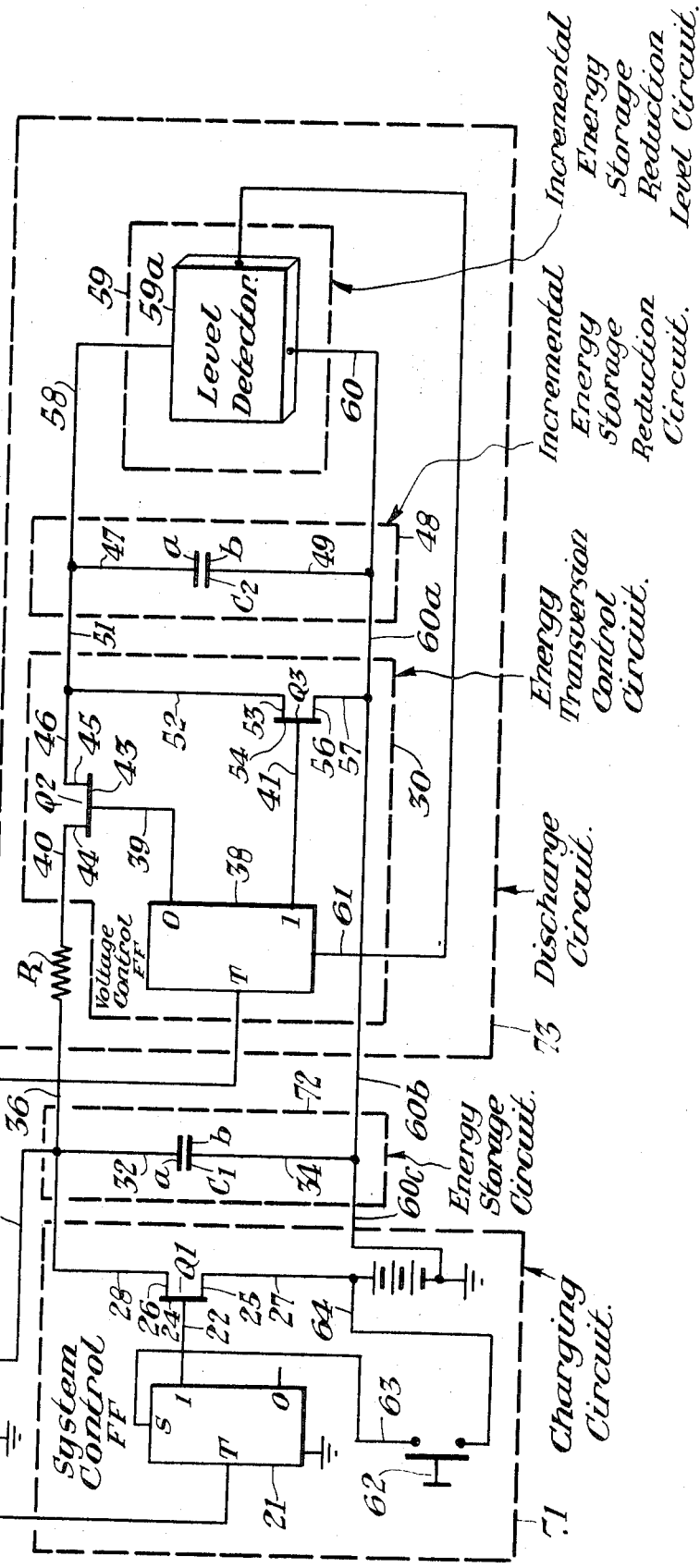
FIG. 2 illustrates a preferred embodiment of the digital-to-analog conversion circuit of the present invention in partial schematic and block diagram form.

The embodiment of the digital-to-analog conversion circuit of the present invention shown in FIG. 1 will now be explained in greater detail as it is shown in FIG. 2. When the tuned receiving coil 12 of train 11 passes wayside transmitting coil 13, a positive going pulse is established on output lead 19 by a tuned receiving coil 12 and circuitry not shown as illustrated in the waveform with the heading "Train Carried Coil" of FIG. 3. This pulse is delivered to a system control flip-flop 21 of charging circuit 71. This toggle flip-flop, or system control flip-flop as it may alternatively be referred to, is depicted as having two inputs on leads 19 and 63 and a single output on lead 22. The operation of the toggle flip-flop 21 is conventional in that whenever a pulse appears on lead 19 the flip-flop 21 will change states. The flip-flop 21 has an initial state where the output present on lead 22 is in a one (1) or a positive state. The appearance of a pulse on lead 19 will cause the output on lead 22 to go to a zero (0). The appearance of the next succeeding pulse on lead 19 will cause the output on lead 22 to go to a one (1). Whenever a pulse appears on lead 63 a "set" function will occur and then the output on lead 22 will always be that of a one (1) state.

The charging circuit 71 includes the toggle flip-flop 21 as well as charge control switch 62, which switch is interposed between the set lead 63 and lead 64 to one terminal of battery 29. When the charge control switch 62 is closed a circuit is completed between the battery 29 via lead 64, switch 62 and lead 63 to the toggle flip-flop 21. This results in a positive or one (1) state on lead 22, which lead 22 is connected to the gate 24 of a conventional field effect transistor $Q_1$. This positive condition on the gate 24 of transistor $Q_1$ allows the transistor $Q_1$ to conduct. With transistor $Q_1$ conducting a charging circuit is completed to the capacitor $C_1$ of the energy storage circuit 72 from battery 29, lead 27, source terminal 25, gate terminal 24, drain terminal 26 of transistor $Q_1$, lead 28, lead 32, capacitor $C_1$, lead 34, and lead 60c to ground. Accordingly, the capacitor $C_1$ is initially charged at a voltage approximately equal to that of the battery 29. The capacitor $C_1$ is maintained at this battery voltage level as long as field effect transistor $Q_1$ is in a state of conduction. At this point it should be recognized that the charging circuit depicted here is but an example of one way to charge capacitor $C_1$ and the details of this charging circuit form no part of the instant invention. Accordingly, any technique may be employed to initially charge the capacitor $C_1$ as long as the remaining circuits to be described are not spuriously affected by the selected mode of charging.

As soon as there appears a pulse from the train-carried coil 12 on the lead 19 the toggle flip-flop 21 will have its output on lead 22 change from a one (1) state to a zero (0) state and this will bring the gate terminal 24 of transistor $Q_1$ to a zero (0) state, thereby rendering the transistor $Q_1$ nonconductive.

The waveform headed "System Control FF" and "$Q_1$" of FIG. 3 illustrates the simultaneous change of state of field effect transistor $Q_1$ with system control flip-flop 21 at a time designated as $t=0$, i.e., the instant tuned receiving coil 12 on train 11 passes wayside transmitting coil 13.

Studying FIG. 3 it will be seen that there is a leading edge of a tachometer pulse present at the instant $Q_1$ ceases to conduct which will result in discharge of capacitor $C_1$ in a manner now to be described. A positive pulse from tachometer 18, present on lead 20, will be delivered to a voltage control flip-flop 38 of the energy transversion control circuit 30. This voltage control flip-flop 38 is a conventional toggle flip-flop that differs only slightly from the system control flip-flop 21 discussed earlier. The voltage control flip-flop as it is to be termed hereafter has two input leads 20 and 61. The lead 61 is a "set" lead and a pulse appearing thereon will set the flip-flop so that the pair of output leads 39 and 41 have respectively thereon a one (1) state and a zero (0) state. Pulses that appear on lead 20 from the tachometer 18 will cause a change in states on the output leads. This voltage control flip-flop 38 is in an initial or "set" condition with a one (1) state on lead 41 and a zero (0) state on lead 39 at the start of system operation for reasons that will become more evident hereinafter. These initial conditions are shown in FIG. 3 in the waveforms with the headings "Voltage Control FF" and "Voltage Control FF." Accordingly, when the leading edge of the first tachometer pulse appears on lead 20 the output on lead 39 of flip-flop 30 will go to a one (1) or positive state.

In addition to the voltage control flip-flop 38 the energy transversion control circuit has a pair of switches $Q_2$ and $Q_3$ which in this embodiment have been selected to be field effect transistors, and also in addition there is an impedance element which takes the form of a resistor R, and which limits current. These switches $Q_2$ and $Q_3$ are positioned within the circuit to provide the following functions. The transistor $Q_2$ when conducting will allow the charging of capacitor $C_2$ of the incremental energy storage reduction circuit 48 by capacitor $C_1$ through a circuit which includes a lead 60c connected to ground, lead 34, capacitor $C_1$, lead 32, lead 36, resistor R, lead 40, source terminal 44, gate terminal 43, drain terminal 45 of transistor $Q_2$, lead 46, lead 47, capacitor $C_2$, lead 49, and lead 60b back to ground lead 60c. Because the flip-flop 38 alternately allows the transistors to conduct, when $Q_2$ is conducting there is no circuit completed through transistor $Q_3$. When transistor $Q_3$ is conducting and $Q_2$ is nonconducting there is a circuit completed through transistor $Q_3$ which includes capacitor $C_2$, and allows for the discharge of capacitor $C_2$. This circuit includes lead 60a, lead 57, drain terminal 56, gate terminal 54, and source terminal 53 of transistor $Q_3$, lead 52, lead 51, lead 47, capacitor $C_2$, and lead 49. The discharging function this circuit provides is termed energy storage reduction. The amount of energy stored in capacitor $C_2$ is dependent upon preselected voltage level detection provided by an incremental energy storage reduction level circuit which, in this embodiment, utilizes a conventional level detector 59a coupled across capacitor $C_2$ by leads 58, 47 and lead 60, 49. Whenever a preselected voltage level is detected the level detector 59a has an output signal on lead 61 to the flip-flop 38, which output signal causes the flip-flop 38 to return to a "set" condition. This "set" condition is manifested by a one (1) or positive output on lead 41 of flip-flop 38 which causes the transistor $Q_3$ to conduct and thereby provide a discharge path or shorting path across the capacitor $C_2$ which results in the voltage level across the energy storage reduction capacitor $C_2$ returning to zero (0). The output from the level detector 59a is designated in FIG. 3 by the waveform headed "Level Detector." During the above cycle of events a voltage reduction has occurred in the energy storage capacitor $C_1$. This change is detected by the distance measuring meter 67 which is electrically coupled to the energy storage capacitor $C_1$, by leads 66, 32 and to ground by leads 34, 60c.

The distance measuring meter 67 may be a very high resistance voltmeter which has a scale of distance values analogous to the constantly decreasing voltage level the meter 67 is monitoring from energy storage capacitor $C_1$. It should be noted that the above discharging cycle will repeat itself each time that a positive tachometer pulse is present on lead 20 of tachometer 18 and there has been an output from level detector 59a delivered to flip-flop 38 over lead 61. This cyclic action may be termed a commutating action between the capacitor $C_1$ of the energy storage circuit 72 and the incremental energy storage reduction circuit 48.

A mathematical interpretation of the above circuit behavior will now be given. The study will be made in conjunction with FIG. 3. If we assume that the initial voltage ($t=0$) across energy storage capacitor $C_1$ is $e_{1\ max}$ and the initial charge across the energy storage capacitor $C_1$ is $q_{1\ max}$, then $$e_{1\ max} = q_{1\ max}/C_1 \quad (1)$$

The initial voltage $e_{1\ max}$ across the energy storage capacitor $C_1$ is depicted in the waveform headed "Distance Measuring Meter (Voltage $C_1$)" in FIG. 3. The voltage across the energy storage capacitor $C_1$ at any given time will simply be $e_1$. Accordingly, the charge across the energy storage capacitor $C_1$ at any given time will simply be $q_1$ and we note that $$e_1 = q_1/C_1 \text{ (for any given time)}. \quad (2)$$

Similarly, we will assume that the initial voltage across the energy storage reduction capacitor $C_2$ is $e_{2\ min}=0$, and the initial charge across the energy storage reduction capacitor $C_2$ is $q_{2\ min}$. Then we note $$e_{2\ min}=0=Aq_{2\ min}/C_2, \text{ or } q_{2\ min}=0. \quad (3)$$

This initial zero voltage is depicted in the waveform headed "Voltage $C_2$" on the same set of axes as the waveform headed "Distance Measuring Meter (Voltage $C_1$)" in FIG. 3. The voltage across the energy storage reduction capacitor $C_2$ at any given time will simply be $e_2$. Accordingly, the charge across the energy storage reduction capacitor $C_2$ at any given time will be $q_2$ and we note that $$e_2 = q_2/C_2 \text{ (for any given time)}. \quad (4)$$

When field effect transistor $Q_2$ begins to conduct and field effect transistor $Q_3$ is nonconductive, i.e., when a positive tachometer pulse appears on lead 20, then energy storage capacitor $C_1$ begins to lose some of its charge to energy storage reduction capacitor $C_2$. The change in charge of energy storage capacitor $C_1$ is noted as $\Delta q_1$, and the total change in charge in the energy storage capacitor $C_1$ after the initial cycle, i.e., after the level detector 59a has produced the sharp pulse output shown in FIG. 3 by the waveform headed "Level Detector" is $(\Delta q_1)$ max. Accordingly, an accompanying change in voltage across the energy storage capacitor $C_1$ is designated as $\Delta e_1$, and the total change in voltage across the energy storage capacitor $C_1$ after the initial cycle is $(\Delta e_1)$ max, as shown in FIG. 3. Hence, $$\Delta e_1 \Delta q_1/C_1 \quad (5)$$

and $$(\Delta e_1) \text{ max.} = \frac{(\Delta q_1) \text{ max.}}{C_1} \quad (6)$$

Similarly, the change in charge of energy storage reduction capacitor $C_2$ is $\Delta q_2$ and the total change in charge in energy storage reduction capacitor $C_2$ after the initial cycle is $(\Delta q_2)$ max. An accompanying change in voltage across the energy storage reduction capacitor $C_2$ is noted as $\Delta e_2$ and the total change in voltage across the energy storage reduction capacitor $C_2$ after the initial cycle is $(\Delta e_2)$ max, as shown in FIG. 3. Hence, $$\Delta e_2 \Delta q_2/c_2 \quad (7)$$

and $$(\Delta e_2) \text{ max} = (\Delta q_2) \text{ max}/C_2 \quad (8)$$

Equations (5), (6), (7) and (8) repeat for each successive discharge cycle. For example, after the second cycle the total change in voltage across energy storage capacitor $C_1$ is $2\{(\Delta e_1) \text{ max}\}$, while the voltage across $C_2$ has risen from zero (0) ($C_2$ shorted) to $(\Delta e_2)$ max at the end of the second cycle, as shown in FIG. 3. It should be noted that the capacitance of energy storage capacitor $C_2$ should be selected preferably such that, for the total distance to be measured, the voltage across the energy storage capacitor $C_1$ will not fall below the limiting voltage of the level detector 59a shown by the dashed line of the waveform headed "Voltage $C_2$" in FIG. 3. It is further noted that $(\Delta e_2)$ max equals this limiting voltage.

Since the change in charge of energy storage capacitor $C_1$ equals the change in charge of energy storage reduction capacitor $C_2$ we note that $$q_1 = _2 \quad (9)$$

and $$(66\ q_1) \text{ max} = (\Delta q_2) \text{ max} \quad (10)$$

or from equations (6) and (8)

$$C_1(\Delta e_1) \text{ max} = C_2(\Delta e_2) \text{ max} \quad (11)$$

and $$(\Delta e_1) \text{ max} = C_2 \frac{(\Delta e_2) \text{ max}}{C_1} \quad (12)$$

Looking at equation (12), since $C_1$ and $C_2$ are constant and $(\Delta e_2)$ max is the limiting voltage of the level detector 59a which is also constant, then $(\Delta e_1)$ max is constant. Thus, for example, after the $n$th cycle the change in voltage across the energy storage capacitor $C_1$ is equal to $n\{(\Delta e_1) \text{ max}\}$. Thus an analogous distance equation for the distance from the train 11 to a given point is $$D = \left[(e_1 \text{ max} - n\{(\Delta e_1) \text{ max}\}\ K\right] \quad (13)$$

where $K$ is a constant scale conversion factor having the dimension ft.-v. where the value of $K$ depends upon the scaling of the distance measuring meter 67.

In words, equation (13) may be expressed as follows: the distance to the final reference point is equal to the initial voltage across energy storage capacitor $C_1$ minus $n$ cycles times the change in voltage across energy storage capacitor $C_1$ for any given cycle, all times a proportionality constant $K$.

It will be understood that while the flip-flop hardware in the embodiment described heretofore is shown to be gated by positive signals other flip-flop hardware may indeed be gated by negative-going or low-level signals. Further, it will be understood that if the tuned receiving coil 12 on train 11 passed wayside coil 13 at a time when tachometer 18 was not at the start of a positive pulse the error in distance indication would be acceptably small. Still further, it should be noted that system operation would not be impeded if negative or low-level tachometer pulses were employed for functional circuit component operations.

It will be appreciated that while the invention has been illustrated as employing solid-state devices the present described invention is also suitably adapted for relay devices as well.

While the invention has been described with reference to a particular embodiment, it is to be understood that other modifications, changes, and variations may be made by those skilled in the art without departing from the spirit of the invention or scope of the claims.

Having thus described our invention, what We claim is:

1. A digital-to-analog conversion circuit to operate from an initial reference point along a given path over which an object moves to a final reference point along the given path, said circuit including
   a. energy storage means,
   b. a charging circuit electrically coupled to said energy storage means for effectively initially controlling the amount of energy stored in said energy storage means,
   c. a discharging circuit having a digital pulse input which input has pulse rates the frequency of which is proportional to the velocity of the object,
   said discharging circuit electrically coupled to said energy storage means and operative to incrementally reduce the amount of energy stored in said energy storage means as a function of both said digital pulse rate and a preselected incremental energy reduction rate,
   said energy storage means having an analog output proportional to the difference in distance between said final reference point along the given path and an intermediate point of the given path at which said object is present.

2. A digital-to-analog conversion circuit to operate from a initial reference point along a given path over which an object moves to a final reference point along the given path, said circuit including
   a. energy storage means,
   b. a charging circuit electrically coupled to said energy storage means for effectively initially controlling the amount of energy stored in said energy storage means,
   c. a digital pulse generating means which produces digital pulses at digital pulse rates the frequency of which is proportional to the velocity of the object,
   d. an incremental energy storage reduction means electrically coupled to an incremental energy storage reduction level limiting means,
   e. energy transversion control means electrically coupled to said energy storage means and to said incremental energy storage reduction means, said energy transversion control means electrically coupled to said digital pulse generator means and associatively controlled thereby,
   said incremental energy storage reduction level limiting means electrically coupled to said energy transversion control means to thereby provide a commutating action between said energy storage means and said incremental energy storage reduction means, whereby said stored energy in said energy storage means is incrementally reduced at rates proportional to said digital pulse rates of said digital pulse generating means, said energy storage means having an analog output proportional to the difference in distance between said final reference point along the given path and an intermediate point of the given path at which said object is present.

3. The digital-to-analog conversion circuit of claim 2, wherein said energy storage means includes a storage capacitor respectively electrically coupled in parallel to said energy transversion control means and said incremental energy storage reduction means.

4. The digital-to-analog conversion circuit of claim 3, wherein said incremental energy storage reduction means includes an incremental reduction capacitor respectively electrically coupled to said energy transversion control means and said energy storage means, said incremental reduction capacitor having a capacitance less than the capacitance of said storage capacitor.

5. The digital-to-analog conversion circuit of claim 4, wherein said energy transversion control means includes a first and a second switch, said first switch electrically coupled between said storage capacitor and said incremental reduction capacitor, said first switch having a switching rate controlled by said digital pulse source, said second switch electrically coupled in a parallel relationship with said incremental reduction capacitor and said incremental energy storage reduction level limiting means.

6. The digital-to-analog conversion circuit of claim 5, wherein said incremental energy storage level limiting means is a level detector electrically coupled in parallel with said incremental reduction capacitor and having an output which controls said second switch and provides said commutation of said energy transversion control means.

7. A distance measuring circuit with inherent digital-to-analog conversion ability for measuring vehicle distance from a given point along a given path over which the vehicle moves over a given range to a final reference point along the given path, said distance measuring circuit including
   a. energy storage means,
   b. a charging circuit electrically coupled to said energy storage means for effectively initially controlling the amount of energy stored in said energy storage means,
   c. a digital pulse generating means which produces pulses at rates proportional to vehicle speed,
   d. an incremental energy storage reduction means electrically coupled to an incremental energy storage reduction level limiting means,
   e. energy transversion control means electrically coupled to said energy storage means and to said incremental energy storage reduction means, said energy transversion control means electrically coupled to said digital pulse generator means and associatively controlled thereby,
   said incremental energy storage level limiting means electrically coupled to said energy transversion control means to thereby provide a commutating action between said energy storage means and said incremental energy storage reduction means, whereby said stored energy in said energy storage means is incrementally reduced at a rate proportional to said digital pulse rate of said digital pulse source, said energy storage means having an analog output proportional to the difference in distance from said final reference point along the given path and an intermediate point of the given path at which said vehicle is present.

8. The distance measuring circuit of claim 7, wherein said energy storage means includes a storage capacitor respectively electrically coupled in parallel to said energy transversion control means and said incremental energy storage reduction means.

9. The distance measuring circuit of claim 8, wherein said incremental energy storage reduction means includes an incremental reduction capacitor respectively electrically coupled to said energy transversion control means and said energy storage means, said incremental reduction capacitor having a capacitance less than the capacitance of said storage capacitor.

10. The distance measuring circuit of claim 9, wherein said energy transversion control means includes a first and a second switch, said first switch electrically coupled between said energy storage capacitor and said incremental energy storage reduction capacitor, said first switch having a switching rate associatively controlled by said digital pulse source and said energy storage level limiting means, said second switch electrically coupled in a parallel relationship with said incremental energy storage reduction capacitor and said incremental energy storage level limiting means.

11. The distance measuring circuit of claim 10, wherein said incremental energy storage reduction level limiting means is a level detector electrically coupled in parallel with said incremental reduction capacitor and having an output which controls said second switch and provides said commutation of said energy transversion control means.